United States Patent
Muller

(10) Patent No.: US 12,158,058 B2
(45) Date of Patent: Dec. 3, 2024

(54) SUPPORTING HAZARDOUS WASTE CANISTERS IN DRILLHOLES

(71) Applicant: Deep Isolation, Inc., Berkeley, CA (US)

(72) Inventor: Richard A. Muller, Berkeley, CA (US)

(73) Assignee: Deep Isolation, Inc., Berkeley, CA (US)

( * ) Notice: Subject to any disclaimer, the term of this patent is extended or adjusted under 35 U.S.C. 154(b) by 0 days.

(21) Appl. No.: 18/038,130

(22) PCT Filed: Jan. 19, 2022

(86) PCT No.: PCT/US2022/012994
§ 371 (c)(1),
(2) Date: May 22, 2023

(87) PCT Pub. No.: WO2022/159502
PCT Pub. Date: Jul. 28, 2022

(65) Prior Publication Data
US 2024/0003226 A1    Jan. 4, 2024

Related U.S. Application Data

(60) Provisional application No. 63/138,885, filed on Jan. 19, 2021.

(51) Int. Cl.
*E21B 41/00* (2006.01)
*E21B 33/14* (2006.01)
(Continued)

(52) U.S. Cl.
CPC ............ *E21B 41/005* (2013.01); *E21B 33/14* (2013.01); *G21F 9/34* (2013.01); *B09B 1/008* (2013.01)

(58) Field of Classification Search
CPC .......... E21B 41/005; E21B 33/14; G21F 9/34; B09B 1/008
See application file for complete search history.

(56) References Cited

U.S. PATENT DOCUMENTS

| | | |
|---|---|---|
| 2,861,636 A | 11/1958 | Messenger |
| 3,379,013 A | 4/1968 | Slagle et al. |

(Continued)

FOREIGN PATENT DOCUMENTS

| | | |
|---|---|---|
| CN | 1973339 | 5/2007 |
| CN | 101124640 | 2/2008 |

(Continued)

OTHER PUBLICATIONS

[No. Author] "Yucca Mountain cost estimate rises to $96 billion," World Nuclear News, Aug. 6, 2008, 2 pages.

(Continued)

*Primary Examiner* — Yong-Suk (Philip) Ro
(74) *Attorney, Agent, or Firm* — Fish & Richardson P.C.

(57) ABSTRACT

A hazardous waste repository includes a drillhole formed from a terranean surface into a subterranean formation. The drillhole includes an entry at the terranean surface and an access portion that extends from the entry toward a storage portion within the subterranean formation. The hazardous waste repository further includes a plurality of hazardous waste canisters emplaced within the storage portion of the drillhole, each of the hazardous waste canisters enclosing hazardous waste; and a granular material installed in a volume of the drillhole between a casing and the plurality of canisters and between adjacent canisters of the plurality of canisters. The granular material is configured to support at least a portion of a weight of each of the plurality of canisters.

23 Claims, 3 Drawing Sheets

(51) Int. Cl.
*G21F 9/34* (2006.01)
*B09B 1/00* (2006.01)

(56) References Cited

U.S. PATENT DOCUMENTS

| | | |
|---|---|---|
| 3,899,631 A | 8/1975 | Clark |
| 4,057,108 A | 11/1977 | Broussard |
| 4,625,122 A | 11/1986 | Botzem et al. |
| 4,708,522 A | 11/1987 | Bergman et al. |
| 4,886,393 A | 12/1989 | Jahn-Held et al. |
| 5,133,624 A | 7/1992 | Cahill |
| 5,165,235 A | 11/1992 | Nitschke |
| 5,202,522 A | 4/1993 | Williams |
| 5,284,996 A | 2/1994 | Vickers |
| 5,318,382 A | 6/1994 | Cahill |
| 5,340,235 A | 8/1994 | Milliken |
| 5,377,104 A | 12/1994 | Sorrells et al. |
| 5,387,741 A | 2/1995 | Shuttle |
| 5,464,988 A | 11/1995 | Rossmasssler et al. |
| 5,489,739 A | 2/1996 | Curry et al. |
| 5,589,603 A | 12/1996 | Alexander et al. |
| 5,785,133 A | 7/1998 | Murray et al. |
| 5,850,614 A | 12/1998 | Crichlow |
| 5,868,210 A | 2/1999 | Johnson et al. |
| 5,920,602 A | 7/1999 | Botzem et al. |
| 6,002,063 A | 12/1999 | Bilak et al. |
| 6,238,138 B1 | 5/2001 | Crichlow |
| 7,068,748 B2 | 6/2006 | Singh |
| 7,287,934 B2 | 10/2007 | Okutsu et al. |
| 7,676,016 B2 | 3/2010 | Singh |
| 8,933,289 B2 | 1/2015 | Crichlow |
| 9,852,822 B2 | 12/2017 | Singh |
| 10,002,683 B2 | 6/2018 | Muller et al. |
| 10,265,743 B1 | 4/2019 | Muller et al. |
| 10,300,512 B2 | 5/2019 | Muller et al. |
| 10,315,238 B1 | 6/2019 | Muller et al. |
| 10,446,287 B2 | 10/2019 | Singh |
| 10,614,927 B2 | 4/2020 | Muller et al. |
| 10,861,614 B2 | 12/2020 | Muller et al. |
| 10,926,306 B2 | 2/2021 | Muller et al. |
| 11,135,629 B2 | 10/2021 | Muller et al. |
| 11,158,434 B2 | 10/2021 | Payer et al. |
| 11,338,337 B2 | 5/2022 | Muller et al. |
| 11,666,953 B2 | 6/2023 | Muller et al. |
| 2002/0020528 A1 | 2/2002 | McCabe et al. |
| 2005/0207525 A1 | 9/2005 | Singh |
| 2008/0039673 A1 | 2/2008 | Maksimov |
| 2008/0308271 A1 | 12/2008 | Chouzenoux et al. |
| 2009/0135986 A1 | 5/2009 | Georgii |
| 2010/0105975 A1 | 4/2010 | Baird |
| 2010/0225107 A1 | 9/2010 | Tverlid |
| 2010/0234663 A1 | 9/2010 | Crichlow |
| 2011/0005762 A1 | 1/2011 | Poole |
| 2011/0054234 A1 | 3/2011 | Georgii |
| 2014/0034875 A1 | 2/2014 | Nakarai et al. |
| 2014/0221722 A1 | 8/2014 | Germanovich et al. |
| 2016/0258226 A1 | 9/2016 | Clemens et al. |
| 2017/0186505 A1 | 6/2017 | Muller et al. |
| 2018/0144841 A1 | 5/2018 | Singh |
| 2018/0182504 A1 | 6/2018 | Muller et al. |
| 2018/0345336 A1 | 12/2018 | Muller et al. |
| 2019/0099790 A1 | 4/2019 | Muller et al. |
| 2019/0295735 A1 | 9/2019 | Crichlow |
| 2019/0318838 A1 | 10/2019 | Muller et al. |
| 2020/0023416 A1 | 1/2020 | Muller et al. |
| 2020/0194140 A1 | 6/2020 | Payer et al. |
| 2020/0211727 A1 | 7/2020 | Muller et al. |
| 2020/0269291 A1 | 8/2020 | Crichlow et al. |
| 2021/0276057 A1 | 9/2021 | Muller et al. |
| 2022/0080481 A1 | 3/2022 | Muller et al. |
| 2022/0157482 A1 | 5/2022 | Finsterle et al. |
| 2022/0402004 A1 | 12/2022 | Muller et al. |

FOREIGN PATENT DOCUMENTS

| | | |
|---|---|---|
| CN | 101971268 | 2/2011 |
| CN | 106782735 | 5/2017 |
| EP | 0390375 | 3/1995 |
| EP | 2555203 | 2/2013 |
| GB | 2104713 | 3/1983 |
| GB | 2151839 | 7/1985 |
| GB | 2161015 | 1/1986 |
| JP | S58042945 | 3/1983 |
| JP | H09264992 | 10/1997 |
| JP | 2000231000 | 8/2000 |
| JP | 2003028991 | 1/2003 |
| JP | 2005091070 | 4/2005 |
| JP | 2005245261 | 9/2005 |
| JP | 2006035068 | 2/2006 |
| JP | 2006170690 | 6/2006 |
| JP | 4902877 | 1/2012 |
| KR | 20200027946 | 3/2020 |
| TW | I484502 | 5/2015 |
| WO | WO 1981001055 | 4/1981 |
| WO | WO 1992007667 | 5/1992 |
| WO | WO 2008032018 | 3/2008 |
| WO | WO 2010007305 | 1/2010 |
| WO | WO 2015069300 | 5/2015 |
| WO | WO 2016164491 | 10/2016 |

OTHER PUBLICATIONS

Arnold, et al., "Reference Design and Operations of Deep Borehole Disposal of High-Level Radioactive Waste," SAND2011-6749, Sandia National Laboratories, 2011, 67 pages.

Buscheck et al., "Thermohydrologic behavior at an underground nuclear waste repository," Water Resources Research, Mar. 2002, 38(3): 1-19.

Chapman and Hooper, "The disposal of radioactive wastes underground," Proceedings of the Geologists Association, 2012, 123(1):46-63.

Cornwall, "Deep Sleep. Boreholes drilled into Earth's crust get a fresh look for nuclear waste disposal," Science, Jul. 10, 2015, 349(6244):132-35.

Dozier, "Feasibility of Very Deep Borehole Disposal of US Nuclear Defense Wastes," Thesis for the degree of Master of Science in Nuclear Science and Engineering, Massachusetts Institute of Technology, Sep. 2011, 176 pages.

Faybishenko et al., Editors, Lawrence Berkeley National Laboratory and Sandia National Laboratories: "International Approaches for Deep Geological Disposal of Nuclear Waste: Geological Challenges in Radioactive Waste Isolation," prepared for the US Department of Energy, Fifth Worldwide Review—2016, 474 pages.

Gibb et al., "A Model for Heat Flow in Deep Borehole Disposals of High-Level Nuclear Waste," J. Geophysical Research, May 6, 2008, 113, 18 pages.

Gibbs, "Feasibility of Lateral Emplacement in Very Deep Borehole Disposal of High Level Nuclear Waste," Thesis for the degrees of Naval Engineering and Nuclear Engineering, Massachusetts Institute of Technology, Jun. 2010, 154 pages.

Haukwa et al., "Modeling thermal-hydrological response of the unsaturated zone at Yucca Mountain, Nevada, to thermal load at a potential repository," Journal of Contaminant Hydrology, 2003, (62-63):529-552.

Hoag, "Canister Design for Deep Borehole Disposal of Nuclear Waste," Thesis for the degree of Master of Science in Nuclear Science and Engineering, Massachusetts Institute of Technology, May 2006, 125 pages.

Hurd, "Choosing and Using A Form Release Agent," Concrete Construction, 1996, 41(10):732-736.

International Preliminary Report on Patentability in International Application No. PCT/US2022/012994, mailed on Aug. 3, 2023, 7 pages.

International Search Report and Written Opinion in International Application No. PCT/US2022/012994, mailed on May 9, 2022, 10 pages.

(56) References Cited

OTHER PUBLICATIONS

King et al., "Copper corrosion under expected conditions in a deep geological repository," Swedish Nuclear Fuel and Waste Management Co., SKB Technical Report TR-01-23, Jan. 1, 2001, 171 pages.

Neuzil et al., "Shale: An overlooked option for US nuclear waste disposal," Bulletin of the Atomic Scientists, Nov. 27, 2014, retrieved on Sep. 26, 2016, retrieved from URL: <http://thebulletin.org/shale-overlooked-option-us-nuclear-waste-disposal7831>, 5 pages.

Neuzil, "Can Shale Safely Host U.S. Nuclear Waste?" EOS, Jul. 23, 2013, 94(30), 3 pages.

ScientificAmerican.com [online], "Why doesn't stainless steel rust?" Mar. 12, 2001, retrieved on Mar. 13, 2024, retrieved from URL: <https://www.scientificamerican.com/article/why-doesnt-stainless-stee/>, 3 pages.

Sone and Zoback, "Mechanical properties of shale-gas reservoir rocks—Part 1:Static and dynamic elastic properties and anisotropy," Geophysics, Sep.-Oct. 2013, 78(5):D381-392.

Thomson, "Performance Confirmation Concepts Study Report," Civilian Radioactive Waste Management System Management & Operating Contractor TRW, Nov. 22, 1996, 331 pages.

U.S. Nuclear Waste Technical Review Board, "A Report to the U.S. Congress and the Secretary of Energy, Evaluation of Technical Issues Associated With the Development of a Separate Repository for U.S. Department of Energy-Managed High-Level Radioactive Waste and Spent Nuclear Fuel, " Jun. 2015 (available at: http://www.nwtrb.gov/reports/disposal_options.pdf), 30 pages.

United States Department of Energy, "Executive Summary—Environmental Impact Statement, Waste Isolation Pilot Plant (WIPP)," Oct. 1980, 1544 pages.

United States Department of Energy, "Quality Assurance Program Document, DOE/CBFO-94-1012 Revision 13," Carlsbad Field Office, Apr. 20, 2017, 127 pages.

United States Department of Energy, "Safety Evaluation Report Addendum for Annual Update of Waste Isolation Plant, Document Safety Analysis, Revision 6, and Technical Safety Requirements, Revision 6," dated Feb. 26, 2018, 55 pages.

United States Department of Energy, "Safety Evaluation Report for Approval of DOE/WIPP 07-3372, Waste Isolation Plant Documented Safety Analysis, Revision 5 and DOE/WIPP 07-3373, Waste Isolation Pilot Plant Technical Safety Requirements, Revision 5," dated Apr. 29, 2016, 235 pages.

United States Department of Energy, "Waste Isolation Pilot Plant, Environmental Monitoring Plan, Revision 10," dated Jun. 22, 2017, 56 pages.

United States Department of Energy, "Waste Isolation Plant, Documented Safety Analysis," Nuclear Waste Partnership LLC Carlsbad, NM, dated Feb. 2018, 777 pages.

United States Department of Energy, "Waste Isolation Plant, Final Supplement, Environmental Impact Statement," dated Jan. 1990, 1498 pages.

United States Department of Energy, "Waste Isolation Plant, Final Technical Safety Requirements," Nuclear Waste Partnership LLC Carlsbad, NM, dated Feb. 2018, 291 pages.

Vartabedian, "Decades-old war over Yucca Mountain nuclear dump resumes under Trump budget plan," Mar. 29, 2017, ralph.vartabdian@latimes.com; twitter @rvartabedian, 4 pages.

Verma et al., "Temperature-dependent thermophysical properties of Ganurgarh shales from Bhander group, India." Environmental Earth Sciences, Feb. 2016, 75(300):1-11.

Winterle et al., "Regulatory Perspectives on Deep Borehole Disposal Concepts," prepared for the U.S. Nuclear Regulatory Commission, Contract NRC-02-07006, Center for Nuclear Waste Regulatory Analyses, San Antonio, TX, May 2011, 24 pages.

Yang et al., "Modeling transient heat transfer in nuclear waste repositories," Journal of Hazardous Materials, 2009 169(1-3):108-112.

YuccaMountain.org [online]; "Eureka County, Nevada—Nuclear Waste Office, FAQ's," last updated Mar. 17, 2017, retrieved from URL: <https://www.yuccamountain.org/faq.htm>, 12 pages.

European Search Report in European Appln No. 22743111.1, mailed on May 6, 2024, 8 pages.

300

301
Identifying a drillhole formed from a terranean surface into a subterranean formation that includes an access portion a storage portion

302
Moving hazardous waste canisters that enclose hazardous waste into position within the storage portion of the drillhole

303
Installing a granular material in a volume of the drillhole between a casing and the canisters and between adjacent canisters

304
Supporting at least a portion of a weight of each of the plurality of canisters with the granular material

FIG. 3

SUPPORTING HAZARDOUS WASTE CANISTERS IN DRILLHOLES

CROSS-REFERENCE TO RELATED APPLICATIONS

This application is the National Stage of International Application No. PCT/US2022/012994, filed Jan. 19, 2022, which claims the benefit of priority of U.S. Application Ser. No. 63/138,885, filed Jan. 19, 2021, the contents of which are incorporated herein by reference in their entireties.

TECHNICAL FIELD

This disclosure relates to storing hazardous material in a subterranean formation and, more particularly, storing nuclear waste in one or more drillholes.

BACKGROUND

Hazardous waste is often placed in long-term, permanent, or semi-permanent storage so as to prevent health issues among a population living near the stored waste. Such hazardous waste storage is often challenging, for example, in terms of storage location identification and surety of containment. For instance, the safe storage of nuclear waste (e.g., spent nuclear fuel, whether from commercial power reactors, test reactors, or even high-grade military waste) is considered to be one of the outstanding challenges of energy technology. Safe storage of the long-lived radioactive waste is a major impediment to the adoption of nuclear power in the United States and around the world. Conventional waste storage methods have emphasized the use of tunnels, and is exemplified by the design of the Yucca Mountain storage facility. Other techniques include boreholes, including vertical boreholes, drilled into crystalline basement rock. Other conventional techniques include forming a tunnel with boreholes emanating from the walls of the tunnel in shallow formations to allow human access.

SUMMARY

In an example implementation, a hazardous waste repository includes a drillhole formed from a terranean surface into a subterranean formation, the drillhole including an entry at the terranean surface and an access portion that extends from the entry toward a storage portion within the subterranean formation; a plurality of hazardous waste canisters emplaced within the storage portion of the drillhole, each of the hazardous waste canisters enclosing hazardous waste; and a granular material installed in a volume of the drillhole between a casing and the plurality of canisters and between adjacent canisters of the plurality of canisters, the granular material configured to support at least a portion of a weight of each of the plurality of canisters.

In an aspect combinable with the example implementation, at least a portion of the casing includes a pre-perforated casing.

In another aspect combinable with any of the previous aspects, the granular material is placed in an annulus between the pre-perforated casing and the subterranean formation.

In another aspect combinable with any of the previous aspects, the drillhole is free from cement in an annulus between the pre-perforated casing and the subterranean formation.

In another aspect combinable with any of the previous aspects, the storage portion is vertical or substantially vertical.

In another aspect combinable with any of the previous aspects, the granular material includes sand.

In another aspect combinable with any of the previous aspects, the hazardous waste includes nuclear waste.

In another aspect combinable with any of the previous aspects, the nuclear waste includes at least a portion of a spent nuclear fuel assembly.

In another aspect combinable with any of the previous aspects, a total weight of each of the plurality of hazardous waste canisters is supported by the granular material.

In another aspect combinable with any of the previous aspects, the drillhole further includes a non-vertical portion coupled to the access portion.

In another aspect combinable with any of the previous aspects, the non-vertical portion includes at least one of a curved portion or a horizontal portion.

In another aspect combinable with any of the previous aspects, the non-vertical portion includes the curved portion and the horizontal portion.

In another aspect combinable with any of the previous aspects, at least a portion of the storage portion of the drillhole is free of the casing.

In another aspect combinable with any of the previous aspects, the storage portion is located within or below a layer that includes at least one of a shale formation layer, a salt formation layer, or other impermeable formation layer.

In another aspect combinable with any of the previous aspects, the storage portion is vertically isolated, by the layer, from a subterranean zone that includes mobile water.

In another aspect combinable with any of the previous aspects, the layer includes a permeability of less than about 0.01 millidarcys and a brittleness of less than about 10 MPa, where brittleness includes a ratio of compressive stress of the barrier layer to tensile strength of the barrier layer.

In another aspect combinable with any of the previous aspects, the layer includes a thickness proximate the hazardous material storage drillhole portion that inhibits diffusion of the hazardous material that escapes the storage canister through the barrier layer for an amount of time that is based on a half-life of the hazardous material.

In another aspect combinable with any of the previous aspects, the layer includes a leakage barrier defined by a time constant for leakage of the hazardous material of 10,000 years or more.

In another example implementation, a method for storing hazardous material includes identifying a drillhole formed from a terranean surface into a subterranean formation, the drillhole including an entry at the terranean surface and an access portion that extends from the entry toward a storage portion within the subterranean formation; moving a plurality of hazardous waste canisters into position within the storage portion of the drillhole, each of the hazardous waste canisters enclosing hazardous waste; installing a granular material in a volume of the drillhole between a casing and the plurality of canisters and between adjacent canisters of the plurality of canisters; and supporting at least a portion of a weight of each of the plurality of canisters with the granular material.

In an aspect combinable with the example implementation, at least a portion of the casing includes a pre-perforated casing.

Another aspect combinable with any of the previous aspects further includes installing the granular material in an annulus between the pre-perforated casing and the subterranean formation.

In another aspect combinable with any of the previous aspects, the drillhole is free from cement in an annulus between the pre-perforated casing and the subterranean formation.

In another aspect combinable with any of the previous aspects, the storage portion is vertical or substantially vertical.

In another aspect combinable with any of the previous aspects, the granular material includes sand.

In another aspect combinable with any of the previous aspects, the hazardous waste includes nuclear waste.

In another aspect combinable with any of the previous aspects, the nuclear waste includes at least a portion of a spent nuclear fuel assembly.

In another aspect combinable with any of the previous aspects, a total weight of each of the plurality of hazardous waste canisters is supported by the granular material.

In another aspect combinable with any of the previous aspects, the drillhole further includes a non-vertical portion coupled to the access portion.

In another aspect combinable with any of the previous aspects, the non-vertical portion includes at least one of a curved portion or a horizontal portion.

In another aspect combinable with any of the previous aspects, the non-vertical portion includes the curved portion and the horizontal portion.

In another aspect combinable with any of the previous aspects, at least a portion of the storage portion of the drillhole is free of the casing.

In another aspect combinable with any of the previous aspects, the storage portion is located within or below a layer that includes at least one of a shale formation layer, a salt formation layer, or other impermeable formation layer.

In another aspect combinable with any of the previous aspects, the storage portion is vertically isolated, by the layer, from a subterranean zone that includes mobile water.

In another aspect combinable with any of the previous aspects, the layer includes a permeability of less than about 0.01 millidarcys and a brittleness of less than about 10 MPa, where brittleness includes a ratio of compressive stress of the barrier layer to tensile strength of the barrier layer.

In another aspect combinable with any of the previous aspects, the layer includes a thickness proximate the hazardous material storage drillhole portion that inhibits diffusion of the hazardous material that escapes the storage canister through the barrier layer for an amount of time that is based on a half-life of the hazardous material.

In another aspect combinable with any of the previous aspects, the layer includes a leakage barrier defined by a time constant for leakage of the hazardous material of 10,000 years or more.

Another aspect combinable with any of the previous aspects further includes removing at least a portion of the granular material from the drillhole; and subsequent to removing, moving at least one of the plurality of canisters through the drillhole to the terranean surface.

Implementations of a hazardous waste repository according to the present disclosure may also include one or more of the following features. For example, a hazardous waste repository according to the present disclosure can include a granular material (e.g., sand) that is installed within a drillhole to support the weight of one or more hazardous waste canisters absent additional weight-supporting apparatus. As another example, the granular material, unlike a cementitious or other hardenable material that can be used to support the weight of the canisters, can be removable to allow removal of the canisters if needed (e.g., for inspection or otherwise). Further, the granular material can have other advantageous properties, such as insulative and/or radiation absorption properties.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flowchart that describes an example method associated with a hazardous waste repository according to the present disclosure.

DETAILED DESCRIPTION

Figure 1:
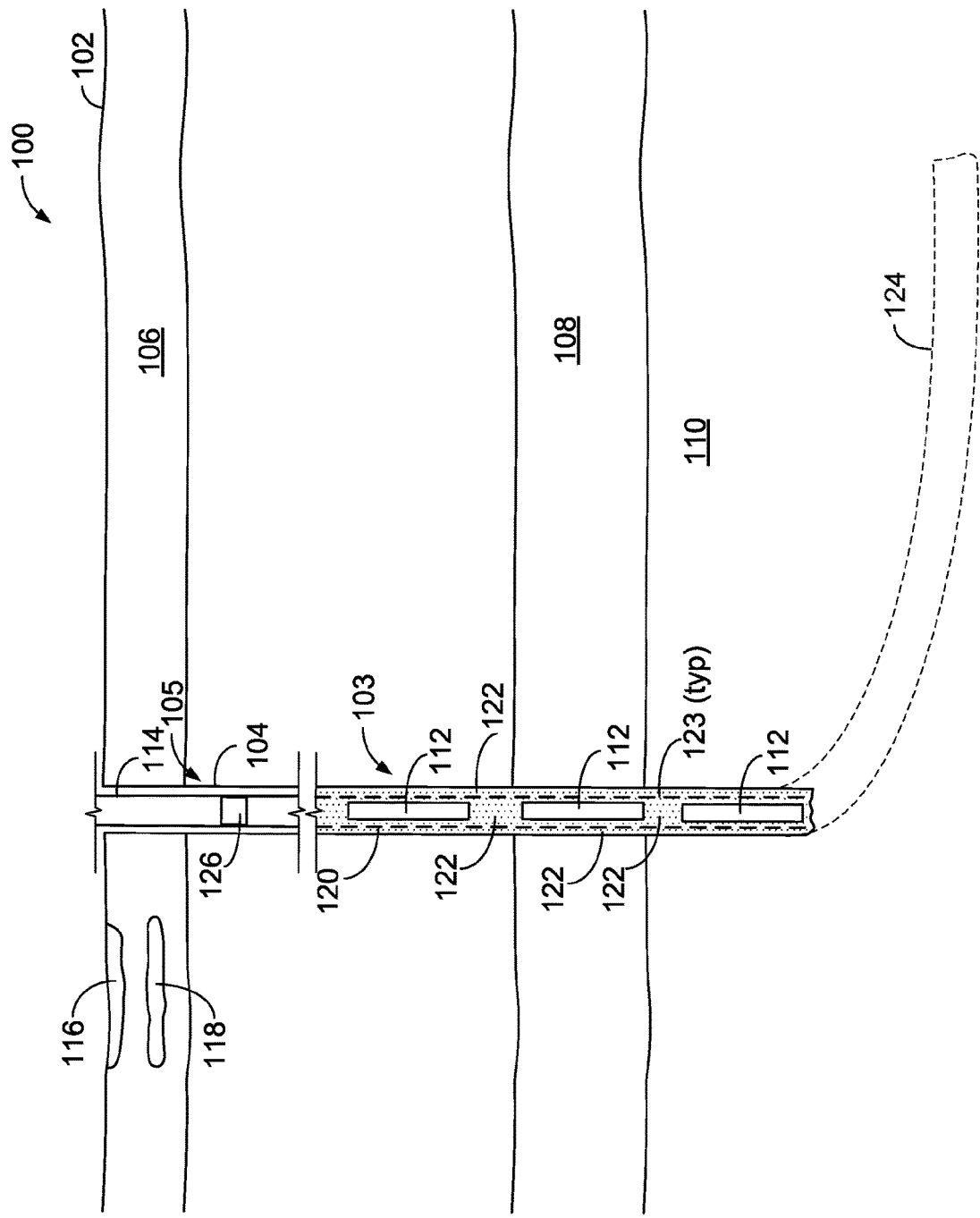
FIG. 1 is a schematic illustration of an example implementation of a hazardous waste repository according to the present disclosure.

FIG. 1 is a schematic illustration of an example implementation of a hazardous waste repository, e.g., a subterranean location for the long-term (e.g., tens, hundreds, or thousands of years or more) but retrievable safe and secure storage of hazardous waste according to the present disclosure. For example, turning to FIG. 1, this figure illustrates an example hazardous waste repository 100 that is formed through one or more subterranean formations and stores (temporarily or permanently) one or more hazardous waste canisters 112. As illustrated, the hazardous waste repository 100 includes a drillhole (i.e., borehole or wellbore) 104 formed (e.g., drilled or otherwise) from a terranean surface 102 and through multiple subterranean layers 106, 108, and 110. Although the terranean surface 102 is illustrated as a land surface, terranean surface 102 may be a sub-sea or other underwater surface, such as a lake or an ocean floor or other surface under a body of water. Thus, the present disclosure contemplates that the drillhole 104 may be formed under a body of water from a drilling location on or proximate the body of water.

The illustrated drillhole 104 is a vertical or substantially (e.g., accounting for drilling imperfections) vertical drillhole in this example of hazardous waste repository 100. As used in the present disclosure, "substantially" in the context of a drillhole orientation, refers to drillholes that may not be exactly vertical (e.g., exactly perpendicular to the terranean surface 102) or exactly horizontal (e.g., exactly parallel to the terranean surface 102), or exactly inclined at a particular incline angle relative to the terranean surface 102. In other words, vertical drillholes often undulate offset from a true vertical direction, that they might be drilled at an angle that deviates from true vertical, and inclined drillholes often undulate offset from a true incline angle. Further, in some aspects, an inclined drillhole may not have or exhibit an exactly uniform incline (e.g., in degrees) over a length of the drillhole. Instead, the incline of the drillhole may vary over its length (e.g., by 1-5 degrees). In this example, although the drillhole 104 is a vertical drillhole, a directional drillhole 124 can also be coupled to the drillhole 104 to form a horizontal drillhole for the repository 100.

The illustrated drillhole 104, in this example, can include a solid surface casing 114 positioned and set around the drillhole 104 from the terranean surface 102 into a particular depth in the Earth. For example, the surface casing 114 may be a relatively large-diameter tubular member (or string of members) set (e.g., cemented) around the drillhole 104 in a shallow formation. As used herein, "tubular" may refer to a member that has a circular cross-section, elliptical cross-section, or other shaped cross-section. For example, in this implementation of the hazardous waste repository 100, the surface casing 114 extends from the terranean surface through a surface layer 106. The surface layer 106, in this example, is a geologic layer comprised of one or more layered rock formations. In some aspects, the surface layer 106 in this example can include surface water sources 116 and underground water sources 118 (e.g., freshwater aquifers, salt water or brine sources), or other sources of mobile water (e.g., water that moves through a geologic formation). In some aspects, the surface casing 114 may isolate the drillhole 104 from such mobile water, and may also provide a hanging location for other casing strings to be installed in the drillhole 104. Further, although not shown, a solid conductor casing may be set above the surface casing 114 (e.g., between the surface casing 114 and the surface 102 and within the surface layer 106) to prevent drilling fluids from escaping into the surface layer 106. In this example, a solid casing is a tubular that does not include perforations or other apertures that fluidly connect an exterior of the casing with an interior of the casing.

The example hazardous waste repository 100 can be used for the disposal of nuclear and other toxic waste. One or more canisters 112 that enclose hazardous waste (such as nuclear waste) are positioned into one or more sections of the drillhole 104 (and drillhole portion 124 if constructed). The canisters 112 containing the waste can be lowered in the drillhole 104 using a variety of techniques, including wireline, coiled tubing, and drill pipe.

In this example, a section of the drillhole 104 in which the hazardous material will be left for extended times can be referred to as a storage section 103. The section of the drillhole 104 that provides access to the storage section 103 can be referred to as an access section 105. In this example, both the storage section 103 and the access section 105 can be vertical or substantially vertical. Once the canisters that enclose the waste (e.g., spent nuclear fuel (SNF) assemblies, high level waste, or other toxic waste) is in place, and the repository is determined to meet the required specifications (e.g., from the U.S. Nuclear Regulatory Commission), the access section 105 of the drillhole 104 can be sealed. A seal 126 can consist of any material or of layers or combinations of materials that slow the hazardous waste movement back up the access section 105; in an example embodiment it consists of layers of cement, salt, rock, bentonite, gravel, and sand. The seal 126 can include fused material, such as fused rock or glass.

The drillhole 104 and associated casings 114 and 120 may be formed with various example dimensions and at various example depths (e.g., true vertical depth, or TVD). For instance, a conductor casing (not shown) may extend down to about 120 feet TVD, with a diameter of between about 28 in. and 60 in. The surface casing 114 may extend down to about 2500 feet TVD, with a diameter of between about 22 in. and 48 in. A solid intermediate casing (not shown) between the surface casing 114 and storage casing 120 may extend down to about 8000 feet TVD, with a diameter of between about 16 in. and 36 in. The foregoing dimensions are merely provided as examples and other dimensions (e.g., diameters, TVDs, lengths) are contemplated by the present disclosure. For example, diameters and TVDs may depend on the particular geological composition of one or more of the multiple subterranean layers (106, 108, 110 and others), particular drilling techniques, as well as a size, shape, or design of a hazardous material canister 112 that contains hazardous material to be deposited in the hazardous waste repository 100. In some alternative examples, the casings can be circular in cross-section, elliptical in cross-section, or some other shape.

As illustrated, the drillhole 104 extends through subterranean layers 106 and 108, and, in this example, lands in a subterranean layer 110. As discussed above, the surface layer 106 may or may not include mobile water. In this example of hazardous waste repository 100, mobile water may be water that moves through a subterranean layer based on a pressure differential across all or a part of the subterranean layer. For example, the surface layer 106 may be a permeable geologic formation in which water freely moves (e.g., due to pressure differences or otherwise) within the layer. In some aspects, the surface layer 106 may be a primary source of human-consumable water in a particular geographic area. Examples of rock formations of which the surface layer 106 may be composed include porous sandstones and limestones, among other formations.

Other illustrated layers, such as the subterranean formations 108 and 110 may include immobile water. Immobile water, in some aspects, is water (e.g., fresh, salt, brine), that is not fit for human or animal consumption, or both. Immobile water, in some aspects, may be water that, by its motion through the layers 108 and 110 (or both), cannot reach a mobile water layer, terranean surface 102, or both, within 10,000 years or more (such as to 1,000,000 years).

In some aspects, one or both of the subterranean formations 108 and 110 is an impermeable layer. The impermeable layer, in this example, may not allow mobile water to pass through. Thus, relative to a mobile water layer, an impermeable layer may have low permeability, e.g., on the order of nanodarcy permeability. An impermeable layer may be a relatively non-ductile (i.e., brittle) geologic formation. One measure of non-ductility is brittleness, which is the ratio of compressive stress to tensile strength. In some examples, the brittleness of an impermeable layer may be between about 20 MPa and 40 MPa. Rock formations of which an impermeable layer may be composed include, for example, certain kinds of sandstone, mudstone, clay, and slate that exhibit permeability and brittleness properties as described above. In such alternative examples, an impermeable layer may be composed of an igneous rock, such as granite.

In some aspects, all or most of the canisters 112 can be emplaced within the subterranean formation 110 as a storage layer. Relative to an impermeable layer or other layers, a storage layer may be thick, e.g., between about 100 and 200 feet of total vertical thickness. Thickness of a storage layer may allow for easier landing and directional drilling, thereby allowing the horizontal portion 124 (if used) to be readily formed within the subterranean formation 110 during construction (e.g., drilling). Further, a storage layer may also have only immobile water, e.g., due to a very low permeability of the layer (e.g., on the order of milli- or nanodarcys). In addition, a storage layer may have sufficient ductility, such that a brittleness of the rock formation that comprises the layer is between about 3 MPa and 10 MPa. Examples of rock formations of which a storage layer may be composed include: shale and anhydrite. Further, in some aspects, hazardous material may be stored below the storage layer, even in a permeable formation such as sandstone or limestone, if the storage layer is of sufficient geologic properties to isolate the permeable layer from a mobile water layer.

In some examples implementations of the hazardous waste repository 100, the subterranean formation 110 is composed of shale. Shale, in some examples, may have properties that fit within those described above for a storage layer. For example, shale formations may be suitable for a long-term confinement of hazardous material (e.g., in the hazardous material canisters 112), and for their isolation from a mobile water layer (e.g., aquifers) and the terranean surface 102. Shale formations may be found relatively deep in the Earth, typically 3000 feet or greater, and placed in isolation below any fresh water aquifers. Other formations may include salt or other impermeable formation layer.

Shale formations (or salt or other impermeable formation layers), for instance, may include geologic properties that enhance the long-term (e.g., thousands of years) isolation of material. Such properties, for instance, have been illustrated through the long term storage (e.g., tens of millions of years) of hydrocarbon fluids (e.g., gas, liquid, mixed phase fluid) without escape of substantial fractions of such fluids into surrounding layers (e.g., mobile water layers). Indeed, shale has been shown to hold natural gas for millions of years or more, giving it a proven capability for long-term storage of hazardous material. Example shale formations (e.g., Marcellus, Eagle Ford, Barnett, and otherwise) has stratification that contains many redundant sealing layers that have been effective in preventing movement of water, oil, and gas for millions of years, lacks mobile water, and can be expected (e.g., based on geological considerations) to seal hazardous material (e.g., fluids or solids) for thousands of years after deposit.

In some aspects, a storage layer and/or an impermeable layer may form a leakage barrier, or barrier layer to fluid leakage that may be determined, at least in part, by the evidence of the storage capacity of the layer for hydrocarbons or other fluids (e.g., carbon dioxide) for hundreds of years, thousands of years, tens of thousands of years, hundreds of thousands of years, or even millions of years. For example, a storage layer and/or impermeable layer may be defined by a time constant for leakage of the hazardous material more than 10,000 years (such as between about 10,000 years and 1,000,000 years) based on such evidence of hydrocarbon or other fluid storage.

Shale (or salt or other impermeable layer) formations may also be at a suitable depth, e.g., between 3000 and 12,000 feet TVD. Such depths are typically below ground water aquifer (e.g., surface layer 106 and/or other mobile water layers). Further, the presence of soluble elements in shale, including salt, and the absence of these same elements in aquifer layers, demonstrates a fluid isolation between shale and the aquifer layers.

Another particular quality of shale that may advantageously lend itself to hazardous material storage is its clay content, which, in some aspects, provides a measure of ductility greater than that found in other, impermeable rock formations (e.g., an impermeable layer). For example, shale may be stratified, made up of thinly alternating layers of clays (e.g., between about 20-30% clay by volume) and other minerals. Such a composition may make shale less brittle and, thus less susceptible to fracturing (e.g., naturally or otherwise) as compared to rock formations in the impermeable layer (e.g., dolomite or otherwise). For example, rock formations in an impermeable layer may have suitable permeability for the long term storage of hazardous material, but are too brittle and commonly are fractured. Thus, such formations may not have sufficient sealing qualities (as evidenced through their geologic properties) for the long term storage of hazardous material.

Each canister 112 may enclose hazardous material. Such hazardous material, in some examples, may be biological or chemical waste or other biological or chemical hazardous material. In some examples, the hazardous material may include nuclear waste material, such as: Cesium-137 and Strontium-90; spent nuclear fuel from commercial nuclear reactors; vitrified waste; fragments of melted core from nuclear accidents; calcine waste; fourth generation nuclear reactor waste; and Transuranic (or TRU) waste. For example, a gigawatt nuclear plant may produce 30 tons of spent nuclear fuel per year. The density of that fuel is typically close to 10 (10 gm/cm$^3$=10 kg/liter), so that the volume for a year of nuclear waste is about 3 m$^3$. Spent nuclear fuel, in the form of nuclear fuel pellets, may be taken from the reactor and not modified. Nuclear fuel pellet are solid, although they can contain and emit a variety of radioactive gases including tritium (13 year half-life), krypton-85 (10.8 year half-life), and carbon dioxide containing C-14 (5730 year half-life).

In some aspects, a storage layer should be able to contain any radioactive output (e.g., gases) within the layer, even if such output escapes the canisters 112. For example, a storage layer may be selected based on diffusion times of radioactive output through the layer. For example, a minimum diffusion time of radioactive output escaping a storage layer may be set at, for example, fifty times a half-life for any particular component of the nuclear fuel pellets. Fifty half-lives as a minimum diffusion time would reduce an amount of radioactive output by a factor of $1 \times 10^{-15}$. As another example, setting a minimum diffusion time to thirty half-lives would reduce an amount of radioactive output by a factor of one billion.

For example, plutonium-239 is often considered a dangerous waste product in spent nuclear fuel because of its long half-life of 24,100 years. For this isotope, 50 half-lives would be 1.2 million years. Plutonium-239 has low solubility in water, is not volatile, and as a solid. its diffusion time is exceedingly small (e.g., many millions of years) through a matrix of the rock formation that comprises a storage layer (e.g., shale or other formation). A storage layer, for example comprised of shale, may offer the capability to have such isolation times (e.g., millions of years) as shown by the geological history of containing gaseous hydrocarbons (e.g., methane and otherwise) for several million years. In contrast, in conventional nuclear material storage methods, there was a danger that some plutonium might dissolve in a layer that comprised mobile ground water upon confinement escape.

In some aspects, the drillhole 104 may be formed for the primary purpose of long-term storage of hazardous materials. In alternative aspects, the drillhole 104 may have been previously formed for the primary purpose of hydrocarbon production (e.g., oil, gas). For example, a storage layer may be a hydrocarbon bearing formation from which hydrocarbons were produced into the drillhole 104 and to the terranean surface 102. In some aspects, a storage layer may have been hydraulically fractured prior to hydrocarbon production. Further in some aspects, the storage casing 120 may have been perforated within the drillhole and prior to hydraulic fracturing. In such aspects, the storage casing 120 may have begun as a solid casing but, prior to emplacement of the canisters 112, become perforated.

In this example, the drillhole 104, while described as "vertical," can be formed with sufficient tilt (that is, axis not at exactly vertical) that an individual canister 112 may not be held in place within the drillhole 104 by friction between the canister 112 and a casing installed in the drillhole 104. Such an orientation can also be referred to as "substantially vertical." In a vertical or substantially vertical drillhole, a weight of each canister 112 can be supported by, for instance, (A) platforms (in between canisters or canister groups), by (B) cementing the canisters to the walls of the casing, or by (C) support of a canister below (i.e., downhole). But each of these methods can have disadvantages. The presence of platforms (A) or cement (B) makes retrieval of the canisters 112 difficult or expensive. The absence of such platforms (option C) means that large forces are placed on the tops of the lower or lowest canisters 112, and this must be addressed by much stronger and heavier canister design. Yet that very heaviness adds to the problem that lower canisters can be crushed by the weight above.

Example embodiments described in the present disclosure address these challenges by filling the gap between the canister 112 and a drillhole casing with a granular material, which could be ordinary sand, crushed quartz, a cementitious granular material, or other materials (including granular materials that, in some aspects, could be solidified or partially solidified with the addition of a fluid) with similar mechanical properties. Such example granular materials can be collectively referred to as "sand" in this disclosure. The sand can (or should) have stability when under pressure, that is, it can (or should) have sufficient shear modulus, when compressed, that the canister will not "slip" through it by its own weight. An example of a sufficient granular material can be ordinary beach sand. (That we why a human does not sink into sand when walking on the beach. Near the water, where the sand is saturated with water, human feet might sink in a few millimeters, until the sufficient water is pressed out of the sand-water mixture to give the mixture a high shear modulus.)

Key parameters for sand include Poisson's ratio, which is the extent to which compressed sand will expand laterally, that is, perpendicular to the direction of the applied force. For sand, this is typically measured to be 0.25. For rubber, it is typically close to 0.5; for clay 0.35; for steel 0.3. For concrete it is typically only 0.15—for many applications, this is considered an advantage, since the concrete does not spread laterally, but it means that the seal against the walls of a container will not be as strong.

Thus, when a force is applied to sand in a closed container (such as a casing installed within a drillhole), the sand attempts to expand laterally, and this results in a high lateral force exerted by the casing. This is true for both dry and wet sand. The Poisson's ratio is in the range of 0.2 to 0.3. That means that the lateral force exerted against the casing (or against the rock, if perforated casing is used) creates a resistance to vertical movement. This phenomenon is very similar to the forces if the canisters were encased in solid rock; thus, the force of the vertical weight of the canister is taken primarily by the surrounding casing or (if the casing is perforated) by the walls of the drillhole, i.e., the rock formation.

A key insight offered by example embodiments is that the advantages of a solid (e.g., cement) fill to hold a hazardous waste canister in place can be readily achieved by a sand fill, with the sand fill offering the substantial advantage that it is readily removable if the top canister (or sequentially, any of the upper canisters) needs to be retrievable when placed in a vertical or substantially vertical drillhole.

In this example, as illustrated, storage casing 120 is positioned and set within the drillhole 104 (e.g., downhole of the surface casing 114) in a portion of the drillhole 104 in which the canisters 112 are emplaced. The example implementation of the hazardous waste repository shown in FIG. 1 includes the storage casing 120 installed in a portion of the drillhole 104. In this example, the storage casing 120 can be installed in the drillhole 104 (e.g., run into the drillhole 104 by threading together multiple casing sections) and connected to the surface casing 114. In this example, the surface casing 114 can be cemented into the drillhole 104.

In an example implementation of the repository 100, all or most of the storage casing 120 is pre-perforated (e.g., perforated prior to installation within the drillhole 104) and no cement is circulated into the annulus between the casing 120 and the subterranean formation(s) 108 and 110. As shown, a granular material or "sand" 122 is installed into the annulus between the casing 120 and the subterranean formations 108 and 110, as well as into a void or space in the drillhole 104 between the casing 120 and the hazardous waste canisters 112, as shown. In some instances, the sand 122 will remain dry; in others, the gap between the grains can be filled with water or brine.

In one realization of this configuration, the storage casing 120 is placed in the drillhole 104. Then sand 122 is lowered or allowed to fall into the bottom of the hole. Some sand 122 flows through the perforations 123 of the casing 120 to fill or partially fill the annulus between the casing 120 and the surface of the drillhole 104. Then a canister 112 is placed on the sand 122. More sand 122 is added, and it flows around the canister 112 in the space between the canister 112 and the casing 120, as well as in the space between the casing 120 and the drillhole wall (i.e., the formation), to further fill or partially fill that volume. Additional sand 122 is placed on the top of the canister 112, filling a region above the canister 112 that can be a few centimeters to a meter or more thick. This sand 122 will also flow into the annulus between the casing 120 and the rock face of the drillhole 104. When this additional layer is in place, a second canister 112 is lowered to sit on the top of this sand layer. Additional sand 122 is then lowered to fill the annuli between the canister 112 and casing 120, and between the casing 120 and the rock wall of the drillhole 104. Then the steps of this process are repeated.

In some aspects, the sand 122 can provide sufficient mechanical coupling between the canister 112 and the casing 120 (and, for perforated casing, to the rock wall) such that the weight of the canister 112 will not be supported primarily by the canister or canisters which are below it. Thus, the use of sand 122 provides the benefits of a solid (non-granular) platform, which remaining relatively easy to remove (since under tension, it does not behave like a solid).

In the case of a pre-perforated casing 120, the weight of the canisters 112 in the drillhole can be borne by the granular material (sand 122) and the granular material is supported by the casing 120. In some aspects, the granular or other (e.g., cement) material that is installed within the annulus between the casing 120 and the subterranean formation(s) 108 and 110 and within the void or space between the casing 120 and the canisters 112 at least partially binds to the rock formation. If the casing is not perforated, then the weight of the canisters can be supported by the sand 122 within the casing, and the sand is supported by the casing.

One advantageous aspect of the sand 122 (compared to a solid fill such as cement or platform) is that it can be readily removed if it is necessary to retrieve the uppermost (or other) canister 112. Sand 122 can be removed in many ways. One method is to flush the region with pressurized water, and then to pump out the sand-filled water. The advantage of the sand 122 (i.e., granular material) fill is that it is more easily removed from the drillhole 104 as compared to a solid (such as cement). Another method to remove the sand 122 is to scoop that sand out from the region between the canister and the casing.

In some aspects, once the sand 122 is installed in the casing 120, a seal 126 can be installed within the drillhole 104 to isolate the storage section 103 from the terranean surface 102. This seal 126 could be a plug, packer, a region filled with cement, sand, gravel, rock or crushed rock, fused rock or glass, or other drillhole seal that fluidly isolates or offers substantial impediment to flow or diffusion through the access section of the drillhole, a portion of the drillhole downhole of the seal from an entry of the drillhole at the terranean surface. The seal 126 could also consist of multiple materials, mixed together or placed in sequence.

Figure 2:
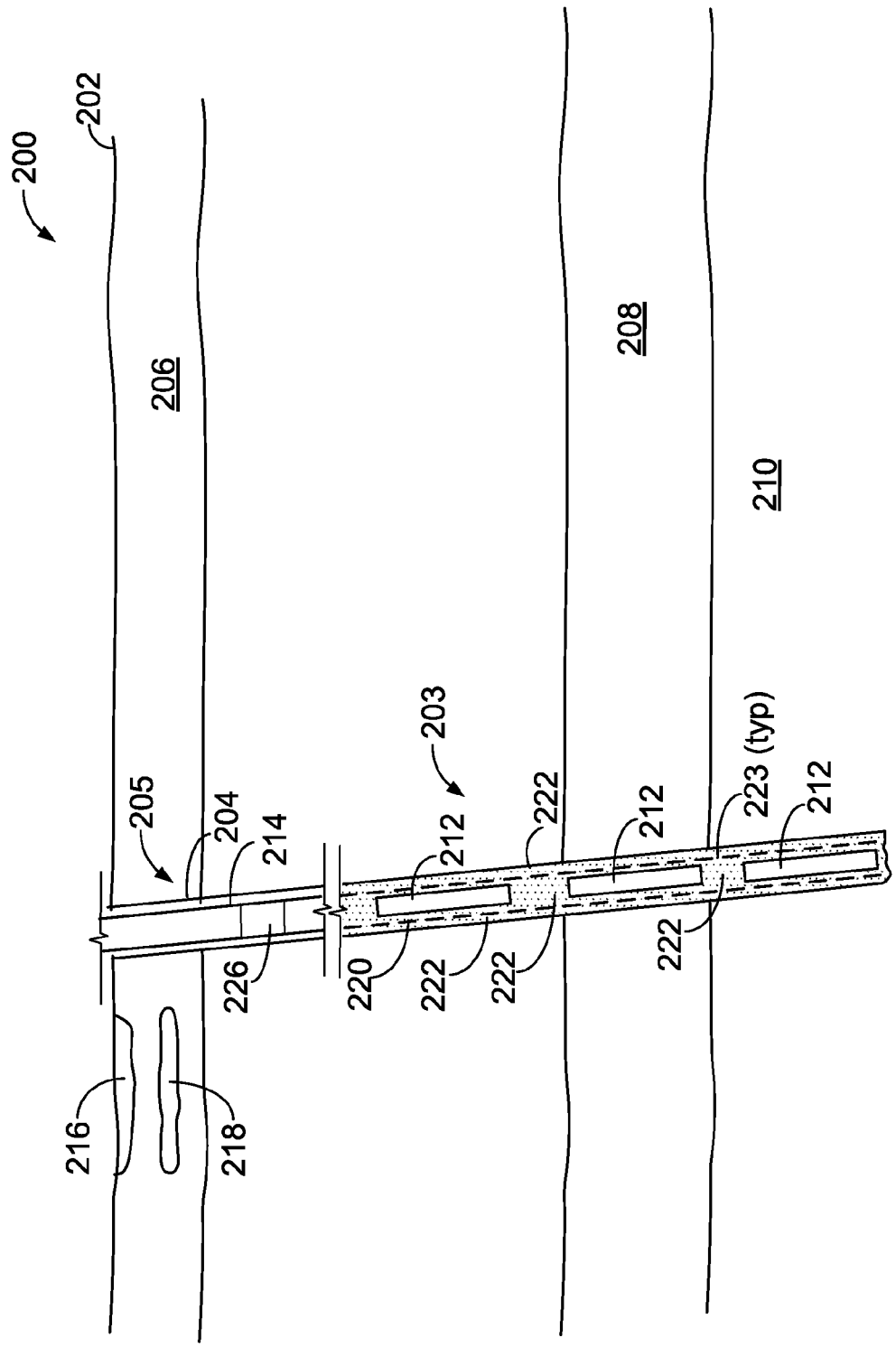
FIG. 2 is a schematic illustration of another example implementation of a hazardous waste repository according to the present disclosure.

FIG. 2 is a schematic illustration of another example implementation of a hazardous waste repository, e.g., a subterranean location for the long-term (e.g., tens, hundreds, or thousands of years or more) but retrievable safe and secure storage of hazardous waste according to the present disclosure. For example, turning to FIG. 2, this figure illustrates an example hazardous waste repository 200 that is formed through one or more subterranean formations and stores (temporarily or permanently) one or more hazardous waste canisters 212. As illustrated, the hazardous waste repository 200 includes a drillhole (i.e., borehole or wellbore) 204 formed (e.g., drilled or otherwise) from a terranean surface 202 and through multiple subterranean layers 206, 208, and 210. Although the terranean surface 202 is illustrated as a land surface, terranean surface 202 may be a sub-sea or other underwater surface, such as a lake or an ocean floor or other surface under a body of water. Thus, the present disclosure contemplates that the drillhole 204 may be formed under a body of water from a drilling location on or proximate the body of water.

The illustrated drillhole 204 is a slant (e.g., accounting for drilling imperfections) drillhole in this example of hazardous waste repository 200. For example, the drillhole 204 is purposefully (e.g., during drilling) inclined with respect to the vertical. By inclined, the angle with respect to the vertical could have any value between 0° ad 90°; in one embodiment it could be 45°. In some aspects, the inclined drillhole 204 may not have or exhibit an exactly uniform incline (e.g., in degrees) over a length of the drillhole. Instead, the incline of the drillhole 204 may vary over its length (e.g., by 1-5 degrees).

The illustrated drillhole 204, in this example, can include a solid surface casing 214 positioned and set around the drillhole 204 from the terranean surface 202 into a particular depth in the Earth. For example, the surface casing 214 may be a relatively large-diameter tubular member (or string of members) set (e.g., cemented) around the drillhole 204 in a shallow formation. For example, in this implementation of the hazardous waste repository 200, the surface casing 214 extends from the terranean surface through a surface layer 206. The surface layer 206, in this example, is a geologic layer comprised of one or more layered rock formations. In some aspects, the surface layer 206 in this example can include surface water sources 216 and underground water sources 218 (e.g., freshwater aquifers, salt water or brine sources), or other sources of mobile water (e.g., water that moves through a geologic formation). In some aspects, the surface casing 214 may isolate the drillhole 204 from such mobile water, and may also provide a hanging location for other casing strings to be installed in the drillhole 204.

Further, although not shown, a solid conductor casing may be set above the surface casing 214 (e.g., between the surface casing 214 and the surface 202 and within the surface layer 206) to prevent drilling fluids from escaping into the surface layer 206. In this example, a solid casing is a tubular that does not include perforations or other apertures that fluidly connect an exterior of the casing with an interior of the casing.

The example hazardous waste repository 200 can be used for the disposal of nuclear and other toxic waste. One or more canisters 212 that enclose hazardous waste (such as nuclear waste) are positioned into one or more sections of the drillhole 204. The canisters 212 containing the waste can be lowered in the drillhole 204 using a variety of techniques, including wireline, coiled tubing, and drill pipe.

In this example, a section of the drillhole 204 in which the hazardous material will be left for extended times can be referred to as a storage section 203. The section of the drillhole 204 that provides access to the storage section 203 can be referred to as an access section 205. In this example, both the storage section 203 and the access section 205 can be vertical or substantially vertical. Once the canisters that enclose the waste (e.g., spent nuclear fuel (SNF) assemblies, high level waste, or other toxic waste) is in place, and the repository is determined to meet the required specifications (e.g., from the U.S. Nuclear Regulatory Commission), the access section 205 of the drillhole 204 can be sealed. A seal 226 can consist of any material or of layers or combinations of materials that slow the hazardous waste movement back up the access section 205; in an example embodiment it consists of layers of cement, salt, rock, bentonite, gravel, and sand. The seal 226 can include fused material, such as fused rock or glass.

The drillhole 204 and associated casings 214 and 220 may be formed with various example dimensions and at various example depths (e.g., true vertical depth, or TVD) as is described with reference to FIG. 1. As described, diameters and TVDs may depend on the particular geological composition of one or more of the multiple subterranean layers (206, 208, 210 and others), particular drilling techniques, as well as a size, shape, or design of a hazardous material canister 212 that contains hazardous material to be deposited in the hazardous waste repository 200. In some alternative examples, the casings can be circular in cross-section, elliptical in cross-section, or some other shape.

As illustrated, the drillhole 204 extends through subterranean layers 206 and 208, and, in this example, lands in a subterranean layer 210. As discussed above, the surface layer 206 may or may not include mobile water. In this example of hazardous waste repository 200, mobile water may be water that moves through a subterranean layer based on a pressure differential across all or a part of the subterranean layer. For example, the surface layer 206 may be a permeable geologic formation in which water freely moves (e.g., due to pressure differences or otherwise) within the layer. In some aspects, the surface layer 206 may be a primary source of human-consumable water in a particular geographic area. Examples of rock formations of which the surface layer 206 may be composed include porous sandstones and limestones, among other formations. Other illustrated layers, such as the subterranean formations 208 and 210 may include immobile water. Immobile water, in some aspects, may be water that, by its motion through the layers 208 and 210 (or both), cannot reach a mobile water layer, terranean surface 202, or both, within 10,000 years or more (such as to 1,000,000 years).

In some aspects, one or both of the subterranean formations 208 and 210 is an impermeable layer as was described with reference to FIG. 1. The impermeable layer, in this example, may not allow mobile water to pass through. In some aspects, all or most of the canisters 212 can be emplaced within the subterranean formation 210 as a storage layer, as that term is described with reference to FIG. 1. In some examples implementations of the hazardous waste repository 200, the subterranean formation 210 is composed of shale as also described with reference to FIG. 1.

Each canister 212 may enclose hazardous material. Such hazardous material, in some examples, may be biological or chemical waste or other biological or chemical hazardous material. In some examples, the hazardous material may include nuclear waste material, such as: Cesium-137 and Strontium-90; spent nuclear fuel from commercial nuclear reactors; vitrified waste; fragments of melted core from nuclear accidents; calcine waste; fourth generation nuclear reactor waste; and Transuranic (or TRU) waste. For example, a gigawatt nuclear plant may produce 30 tons of spent nuclear fuel per year. The density of that fuel is typically close to 10 (10 gm/cm$^3$=10 kg/liter), so that the volume for a year of nuclear waste is about 3 m$^3$. Spent nuclear fuel, in the form of nuclear fuel pellets, may be taken from the reactor and not modified. Nuclear fuel pellet are solid, although they can contain and emit a variety of radioactive gases including tritium (13 year half-life), krypton-85 (10.8 year half-life), and carbon dioxide containing C-14 (5730 year half-life).

In some aspects, a storage layer should be able to contain any radioactive output (e.g., gases) within the layer, even if such output escapes the canisters 212. For example, a storage layer may be selected based on diffusion times of radioactive output through the layer. For example, a minimum diffusion time of radioactive output escaping a storage layer may be set at, for example, fifty times a half-life for any particular component of the nuclear fuel pellets. Fifty half-lives as a minimum diffusion time would reduce an amount of radioactive output by a factor of $1 \times 10^{-15}$. As another example, setting a minimum diffusion time to thirty half-lives would reduce an amount of radioactive output by a factor of one billion.

For example, plutonium-239 is often considered a dangerous waste product in spent nuclear fuel because of its long half-life of 24,100 years. For this isotope, 50 half-lives would be 1.2 million years. Plutonium-239 has low solubility in water, is not volatile, and as a solid. its diffusion time is exceedingly small (e.g., many millions of years) through a matrix of the rock formation that comprises a storage layer (e.g., shale or other formation). A storage layer, for example comprised of shale, may offer the capability to have such isolation times (e.g., millions of years) as shown by the geological history of containing gaseous hydrocarbons (e.g., methane and otherwise) for several million years. In contrast, in conventional nuclear material storage methods, there was a danger that some plutonium might dissolve in a layer that comprised mobile ground water upon confinement escape.

In some aspects, the drillhole 204 may be formed for the primary purpose of long-term storage of hazardous materials. In alternative aspects, the drillhole 204 may have been previously formed for the primary purpose of hydrocarbon production (e.g., oil, gas). For example, a storage layer may be a hydrocarbon bearing formation from which hydrocarbons were produced into the drillhole 204 and to the terranean surface 202. In some aspects, a storage layer may have been hydraulically fractured prior to hydrocarbon production. Further in some aspects, the storage casing 220 may have been perforated within the drillhole and prior to hydraulic fracturing. In such aspects, the storage casing 220 may have begun as a solid casing but, prior to emplacement of the canisters 212, become perforated.

In this example, the slant drillhole 204 can be formed with sufficient tilt (that is, axis not at exactly vertical) that an individual canister 212 may not be held in place within the drillhole 204 by friction between the canister 212 and a casing installed in the drillhole 204. Here, a weight of each canister 212 can be supported by, for instance, (A) platforms (in between canisters or canister groups), by (B) cementing the canisters to the walls of the casing, or by (C) support of a canister below (i.e., downhole). But each of these methods can have disadvantages. The presence of platforms (A) or cement (B) makes retrieval of the canisters 212 difficult or expensive. The absence of such platforms (option C) means that large forces are placed on the tops of the lower or lowest canisters 212, and this must be addressed by much stronger and heavier canister design. Yet that very heaviness adds to the problem that lower canisters can be crushed by the weight above.

Example embodiments described in the present disclosure address these challenges by filling the gap between the canister 212 and a drillhole casing with sand 222 (as that term is described with reference to FIG. 1). In this example, as illustrated, storage casing 220 is positioned and set within the drillhole 204 (e.g., downhole of the surface casing 214) in a portion of the drillhole 204 in which the canisters 212 are emplaced. The example implementation of the hazardous waste repository shown in FIG. 2 includes the storage casing 220 installed in a portion of the drillhole 204. In this example, the storage casing 220 can be installed in the drillhole 204 (e.g., run into the drillhole 204 by threading together multiple casing sections) and connected to the surface casing 214. In this example, the surface casing 214 can be cemented into the drillhole 204.

In an example implementation of the repository 200, all or most of the storage casing 220 is pre-perforated (e.g., perforated prior to installation within the drillhole 204) and no cement is circulated into the annulus between the casing 220 and the subterranean formation(s) 208 and 210. As shown, a granular material or "sand" 222 is installed into the annulus between the casing 220 and the subterranean formations 208 and 210, as well as into a void or space in the drillhole 204 between the casing 220 and the hazardous waste canisters 212, as shown. In some instances, the sand 222 will remain dry; in others, the gap between the grains can be filled with water or brine.

In one realization of this configuration, the storage casing 220 is placed in the drillhole 204. Then sand 222 is lowered or allowed to fall into the bottom of the hole. Some sand 222 flows through the perforations 223 of the casing 220 to fill or partially fill the annulus between the casing 220 and the surface of the drillhole 204. Then a canister 212 is placed on the sand 222. More sand 222 is added, and it flows around the canister 212 in the space between the canister 212 and the casing 220, as well as in the space between the casing 220 and the drillhole wall (i.e., the formation), to further fill or partially fill that volume. Additional sand 222 is placed on the top of the canister 212, filling a region above the canister 212 that can be a few centimeters to a meter or more thick. This sand 222 will also flow into the annulus between the casing 220 and the rock face of the drillhole 204. When this additional layer is in place, a second canister 212 is lowered to sit on the top of this sand layer. Additional sand 222 is then lowered to fill the annuli between the canister 212 and casing 220, and between the casing 220 and the rock wall of the drillhole 204. Then the steps of this process are repeated.

In some aspects, the sand 222 can provide sufficient mechanical coupling between the canister 212 and the casing 220 (and, for perforated casing, to the rock wall) such that the weight of the canister 212 will not be supported primarily by the canister or canisters which are below it. Thus, the use of sand 222 provides the benefits of a solid (non-granular) platform, which remaining relatively easy to remove (since under tension, it does not behave like a solid).

In the case of a pre-perforated casing 220, the weight of the canisters 212 in the drillhole can be borne by the granular material (sand 222) and the granular material is supported by the casing 220. In some aspects, the granular or other (e.g., cement) material that is installed within the annulus between the casing 220 and the subterranean formation(s) 208 and 210 and within the void or space between the casing 220 and the canisters 212 at least partially binds to the rock formation. If the casing is not perforated, then the weight of the canisters can be supported by the sand 222 within the casing, and the sand is supported by the casing.

One advantageous aspect of the sand 222 (compared to a solid fill such as cement or platform) is that it can be readily removed if it is necessary to retrieve the uppermost (or other) canister 212. Sand 222 can be removed in many ways. One method is to flush the region with pressurized water, and then to pump out the sand-filled water. The advantage of the sand 222 (i.e., granular material) fill is that it is more easily removed from the drillhole 204 as compared to a solid (such as cement). Another method to remove the sand 222 is to scoop that sand out from the region between the canister and the casing.

In some aspects, once the sand 222 is installed in the casing 220, a seal 226 can be installed within the drillhole 204 to isolate the storage section 203 from the terranean surface 202. This seal 226 could be a plug, packer, a region filled with cement, sand, gravel, rock or crushed rock, fused rock or glass, or other drillhole seal that fluidly isolates or offers substantial impediment to flow or diffusion through the access section of the drillhole, a portion of the drillhole downhole of the seal from an entry of the drillhole at the terranean surface. The seal 226 could also consist of multiple materials, mixed together or placed in sequence.

FIG. 3 is a flowchart that describes an example method 300 associated with a hazardous waste repository, such as either of the hazardous waste repositories 100 or 200. Method 300 can begin at step 301, which includes identifying a drillhole formed from a terranean surface into a subterranean formation that includes an access portion a storage portion. For example, using the repository 100 as an example, drillhole 104 can be identified as a repository for hazardous waste, such as nuclear waste or other hazardous waste. In some aspects, as shown, the drillhole includes the access portion 105 and the storage portion 103. The access portion 105 includes an entry at the terranean surface 102 and is coupled to the storage portion 103. In some aspects, prior to step 301, method 300 can include constructing (e.g., drilling) the drillhole 104, as well as any other steps required to prepare the drillhole 104 for receiving one or more hazardous waste canisters 112.

In some aspects, step 301 can also include installing one or more casings in the drillhole 104. For example, as described, one or more of a conductor casing, surface casing 114, and storage casing 120 can be installed (e.g., cemented or not cemented) within the drillhole 104. In some aspects, portions of an installed casing string can be solid without perforations. For example, the surface casing 114 or any other casing that is installed through a formation with mobile water can be solid without perforations. In some aspects, other portions of an installed casing string can include pre-perforated casing sections (e.g., sections in which perforations are made in the casing sections prior to installation in the drillhole 104). For example, the storage casing 120 can be pre-perforated. Alternatively, casing sections (such as the storage casing 114) can be perforated subsequent to installation in the drillhole 104.

Method 300 can continue at step 302, which includes moving hazardous waste canisters that enclose hazardous waste into position within the storage portion of the drillhole. For example, the hazardous waste canister 112 can be moved, e.g., one at a time, into the drillhole 104 for temporary or permanent emplacement in the storage portion 103.

Method 300 can continue at step 303, which includes installing a granular material in a volume of the drillhole between a casing and the canisters and between adjacent canisters. For example, in some aspects, even prior to any emplacement of a canister 112 in step 302, a portion of a granular material (e.g., sand 122) can be installed in the drillhole 104 to act as an initial support material for the first canister 112 (e.g., emplaced at a bottom hole end of the storage portion 103). Once a canister 112 is emplaced in step 302, further sand 122 can be installed to surround the emplaced canister 112 in step 303. Then, another canister 112 can be emplaced in another iteration of step 302 and further sand 122 can be installed to surround the emplaced canister 112 in another iteration of step 303. Thus, in some aspects, steps 302 and 303 can be alternated in an iterative process until all of the canisters 112 are emplaced and surrounded by installed sand 122. In some aspects, completion of step 303 can include filling all of a volume of the storage portion 103 between and around the canisters 112, as well as an annulus between the subterranean formation(s) and the storage casing 120, with the sand 122.

Method 300 can continue at step 304, which includes supporting at least a portion of a weight of each of the plurality of canisters with the granular material. For example, once each of the canisters 112 that is emplaced in the storage portion 103 of the drillhole 104 is surrounded by the sand 122, the sand 122 can support the weight of the emplaced canister 122 absent further supporting apparatus. For example, the sand 122 can have stability when under pressure, and can have sufficient shear modulus, when compressed, that the canister 122 will not slip through by its own weight. As the Poisson's ratio of sand can be about 0.25, when the weight of the canister 122 is applied to the installed sand 122, the sand 122 attempts to expand laterally, and this results in a high lateral force exerted by the support casing 120. Thus, a lateral force exerted against the casing 120 (or against the rock formation through the perforations 123 of the casing 120) creates a resistance to vertical movement resulting in support of the canister 112.

Method 300 can include other steps as well. For example, a seal, such as seal 126 can be installed at or near the access portion 105 once the canisters 112 have been emplaced. Further, for example, once one or more canisters 112 are emplaced, it can be determined that at least one canister 112 should be removed from the drillhole 104. Thus, in some cases, at least a portion of the sand 122 that is installed in the drillhole 104 can be removed (e.g., subsequent to removal of the seal 126). Next, once the portion of sand 122 is removed, one or more of the canisters 112 can be removed from the drillhole 104.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A hazardous waste repository, comprising:
a drillhole formed from a terranean surface into a subterranean formation, the drillhole comprising an entry at the terranean surface and an access portion that extends from the entry toward a storage portion within the subterranean formation;
a plurality of hazardous waste canisters emplaced within the storage portion of the drillhole, each of the hazardous waste canisters enclosing hazardous waste; and
a granular material installed in a volume of the drillhole between a casing installed in the drillhole and the plurality of hazardous waste canisters and between adjacent hazardous waste canisters of the plurality of hazardous waste canisters, the granular material having a Poisson's ratio selected to support at least a portion of a weight of each of the plurality of hazardous waste canisters and to mechanically couple the plurality of hazardous waste canisters and the casing installed in the drillhole.

2. The hazardous waste repository of claim 1, wherein at least a portion of the casing comprises a pre-perforated casing that is perforated prior to installation in the drillhole.

3. The hazardous waste repository of claim 2, wherein the granular material is placed in an annulus between the pre-perforated casing and the subterranean formation.

4. The hazardous waste repository of claim 2, wherein the drillhole is free from cement in an annulus between the pre-perforated casing and the subterranean formation.

5. The hazardous waste repository of claim 1, wherein the storage portion is vertical or substantially vertical.

6. The hazardous waste repository of claim 1, wherein the hazardous waste comprises nuclear waste.

7. The hazardous waste repository of claim 1, wherein a total weight of each of the plurality of hazardous waste canisters is supported by the granular material.

8. The hazardous waste repository of claim 1, wherein the drillhole further comprises a non-vertical portion coupled to the access portion, the non-vertical portion comprising at least one of a curved portion, a horizontal portion, or a slanted portion.

9. The hazardous waste repository of claim 1, wherein at least a portion of the storage portion of the drillhole is free of the casing.

10. The hazardous material repository of claim 1, wherein the storage portion is located within or below a layer that comprises at least one of a shale formation layer, a salt formation layer, or other impermeable formation layer, and the storage portion is vertically isolated, by the layer, from a subterranean zone that comprises mobile water.

11. The hazardous material repository of claim 10, wherein the layer comprises a permeability of less than about 0.01 millidarcys and a brittleness of less than about 10 MPa, where brittleness comprises a ratio of compressive stress of the barrier layer to tensile strength of the barrier layer.

12. The hazardous material repository of claim 10, wherein the layer comprises a thickness proximate the hazardous material storage drillhole portion that inhibits diffusion of the hazardous material that escapes the storage canister through the barrier layer for an amount of time that is based on a half-life of the hazardous material.

13. A method for storing hazardous material, comprising:
identifying a drillhole formed from a terranean surface into a subterranean formation, the drillhole comprising an entry at the terranean surface and an access portion that extends from the entry toward a storage portion within the subterranean formation;
moving a plurality of hazardous waste canisters into position within the storage portion of the drillhole, each of the hazardous waste canisters enclosing hazardous waste;
installing a granular material in a volume of the drillhole between a casing installed in the drillhole and the plurality of canisters and between adjacent canisters of the plurality of canisters, the granular material having a Poisson's ratio selected to support at least a portion of a weight of each of the plurality of hazardous waste canisters;
mechanically coupling the plurality of hazardous waste canisters and the casing installed in the drillhole with the granular material; and
supporting at least the portion of the weight of each of the plurality of canisters with the granular material.

14. The method of claim 13, wherein at least a portion of the casing comprises a pre-perforated casing that is perforated prior to installation in the drillhole.

15. The method of claim 14, further comprising installing the granular material in an annulus between the pre-perforated casing and the subterranean formation.

16. The method of claim 14, wherein the drillhole is free from cement in an annulus between the pre-perforated casing and the subterranean formation.

17. The method of claim 13, wherein the storage portion is vertical or substantially vertical.

18. The method of claim 13, wherein the hazardous waste comprises nuclear waste.

19. The method of claim 13, wherein a total weight of each of the plurality of hazardous waste canisters is supported by the granular material.

20. The method of claim 13, wherein the drillhole further comprises a non-vertical portion coupled to the access portion, the non-vertical portion comprising at least one of a curved portion, a horizontal portion, or a slanted portion.

21. The method of claim 13, wherein at least a portion of the storage portion of the drillhole is free of the casing.

22. The method of claim 13, wherein the storage portion is located within or below a layer that comprises at least one of a shale formation layer, a salt formation layer, or other impermeable formation layer, the storage portion is vertically isolated, by the layer, from a subterranean zone that comprises mobile water.

23. The method of claim 13, further comprising:
removing at least a portion of the granular material from the drillhole; and
subsequent to removing, moving at least one of the plurality of canisters through the drillhole to the terranean surface.

* * * * *